(12) United States Patent
Wang et al.

(10) Patent No.: US 8,493,568 B2
(45) Date of Patent: Jul. 23, 2013

(54) OPTICAL IMAGING APPARATUS AND METHOD

(75) Inventors: Yu-Ta Wang, Taipei (TW); Po-Kai Hsu, Taipei (TW); Kuang-Yu Hsu, Taipei (TW); Dong-Yo Jheng, Taipei (TW); Chien-Chung Tsai, Taipei (TW); Sheng-Lung Huang, Taipei (TW)

(73) Assignee: National Taiwan University, Taipei (TW)

( * ) Notice: Subject to any disclaimer, the term of this patent is extended or adjusted under 35 U.S.C. 154(b) by 523 days.

(21) Appl. No.: 12/497,986

(22) Filed: Jul. 6, 2009

(65) Prior Publication Data

US 2011/0001982 A1   Jan. 6, 2011

(51) Int. Cl.
*G01B 11/02* (2006.01)

(52) U.S. Cl.
USPC ............................................ 356/497

(58) Field of Classification Search
USPC .......................... 356/479, 497, 511
See application file for complete search history.

(56) References Cited

U.S. PATENT DOCUMENTS

| | | | |
|---|---|---|---|
| 5,321,501 A | 6/1994 | Swanson et al. | |
| 5,491,524 A | 2/1996 | Hellmuth et al. | |
| 5,493,109 A | 2/1996 | Wei et al. | |
| 5,956,355 A | 9/1999 | Swanson et al. | |
| 6,485,413 B1* | 11/2002 | Boppart et al. | 600/160 |
| 6,961,123 B1 | 11/2005 | Wang et al. | |
| RE42,641 E * | 8/2011 | Izatt et al. | 356/497 |
| 2008/0252901 A1* | 10/2008 | Shimizu et al. | 356/497 |

OTHER PUBLICATIONS

Superluminescent sources, Encyclopedia of Laser Physics and Technology, Oct. 12, 2007, accessed through http://web.archive.org.*

* cited by examiner

*Primary Examiner* — Tarifur Chowdhury
*Assistant Examiner* — Jonathan Hansen
(74) *Attorney, Agent, or Firm* — Muncy, Geissler, Olds & Lowe, PLLC (57) ABSTRACT

The present invention relates to an optical imaging apparatus and a method, and more particularly to an optical imaging apparatus and a method with short coherence length optical source. The apparatus comprises an optical source with a plurality of outputs for providing a reference light and a sample light; a sample probe module for leading the sample light to a sample, and leading an information light out; an interference module for leading the reference light to a photo detector, and leading the information light to the photo detector; and a signal processing unit electrically coupled to the photo detector; wherein the reference light and the information light are superimposed on the photo detector, an interference light pattern is detected by the photo detector, and a signal that represents the interference light pattern is transmitted to said signal processing unit for analyzing the spatial information of the sample.

22 Claims, 6 Drawing Sheets

OPTICAL IMAGING APPARATUS AND METHOD

FIELD OF THE INVENTION

The present invention relates to an optical imaging apparatus and a method, and more particularly to an optical imaging apparatus and a method with short coherence length optical source or partial coherence length optical source.

BACKGROUND OF THE INVENTION

Optical coherence domain reflectometry (OCDR) is a technique initially developed to provide a higher resolution over optical time domain reflectometry (OTDR) for the characterization of the position and the magnitude of reflection sites. With the addition of transverse scanning, this technique has been widely and successfully extended to the imaging of biological tissues, and is termed optical coherence tomography (OCT).

Optical Coherence Tomography (OCT) is a non-invasive, real-time imaging technique capable of obtaining images and making measurements on the order of about 10 microns or less. OCT has been used to measure the dimensions of the eye as described in U.S. Pat. Nos. 5,321,501 and 5,493,109.

The traditional interferometer configuration for OCDR or OCT is a standard Michelson interferometer. A light beam from a broadband source is input into a beam splitter, where the light beam is split and directed into a sample arm and a reference arm. An optical probe in the sample arm extends into a device that scans an object with a beam of light. The light beam input into the reference arm is reflected back by a reference mirror. The reflected reference beam from reference arm and the scattered sample beam from sample arm pass back through the beam splitter to a detector, which processes the signals by techniques known in the art to produce a backscatter profile or image on a display unit.

This configuration is limited to an optical efficiency of 25%, and 75% of the optical power supplied by the light source is wasted. If the light source cannot provide enough optical power, the interference light pattern may be too dim for the detector to detect.

SUMMARY OF THE INVENTION

It is an objective of the present invention to provide an optical imaging apparatus and a method with short coherence length optical source or partial coherence length optical source.

It is another objective of the present invention to provide an optical imaging apparatus and a method comprising a light source with a plurality of outputs, such as a two outputs light source, for enhancing the optical efficiency.

It is another objective of the present invention to provide an optical imaging apparatus comprising a drive module for moving the light source module to adjust the lengths of reference light path and sample light path.

It is another objective of the present invention to provide an optical imaging apparatus and a method, wherein the light source is a two outputs SLD source for providing high intensity light beams.

It is another objective of the present invention to provide an optical imaging apparatus and a method, wherein the light source is a two outputs CDF source for providing high intensity light beams.

It is another objective of the present invention to provide an optical imaging apparatus, wherein the imaging module comprises a beam splitter and two photo detectors for broadening the intensity tolerance scope of the imaging module.

The present invention provides an optical imaging apparatus, comprising: an optical source module including an optical source, wherein said optical source comprises a plurality of outputs at distinct sites, said plurality of outputs interferes with each other, wherein at least one output of said plurality of outputs is used as a reference light, and at least one output of said plurality of outputs is used as a sample light; a sample probe module for leading said sample light from said optical source module to a sample via a first light path, wherein a portion of said sample light is reflected or scattered by said sample to form an information light, wherein said information light is leaded out by said sample probe module; an interference module including at least one photo detector, wherein said interference module leads said reference light from said optical source module to said at least one photo detector via a second light path, and leads said information light from said sample probe module to said at least one photo detector via a third light path; and a signal processing unit electrically coupled to said photo detector of said interference module for analyzing the spatial information of said sample.

The present invention further provides an optical imaging method, comprising steps of: providing an optical source with a plurality of outputs; using at least one output of said plurality of outputs of said optical source as a reference light, and at least one output of said plurality of outputs as a sample light; leading said sample light to said sample via a first light path, wherein a portion of said sample light is reflected or scattered by said sample to form a information light; leading said reference light to a photo detector via a second light path; leading said information light to said photo detector via a third light path; providing a signal processing unit electrically coupled to said photo detector; adjusting the length of said second light path and the total length of said first light path and said third light path; analyzing said spatial information of said sample by said signal processing unit.

DETAILED DESCRIPTION OF DISCLOSED EMBODIMENTS

Figure 1:
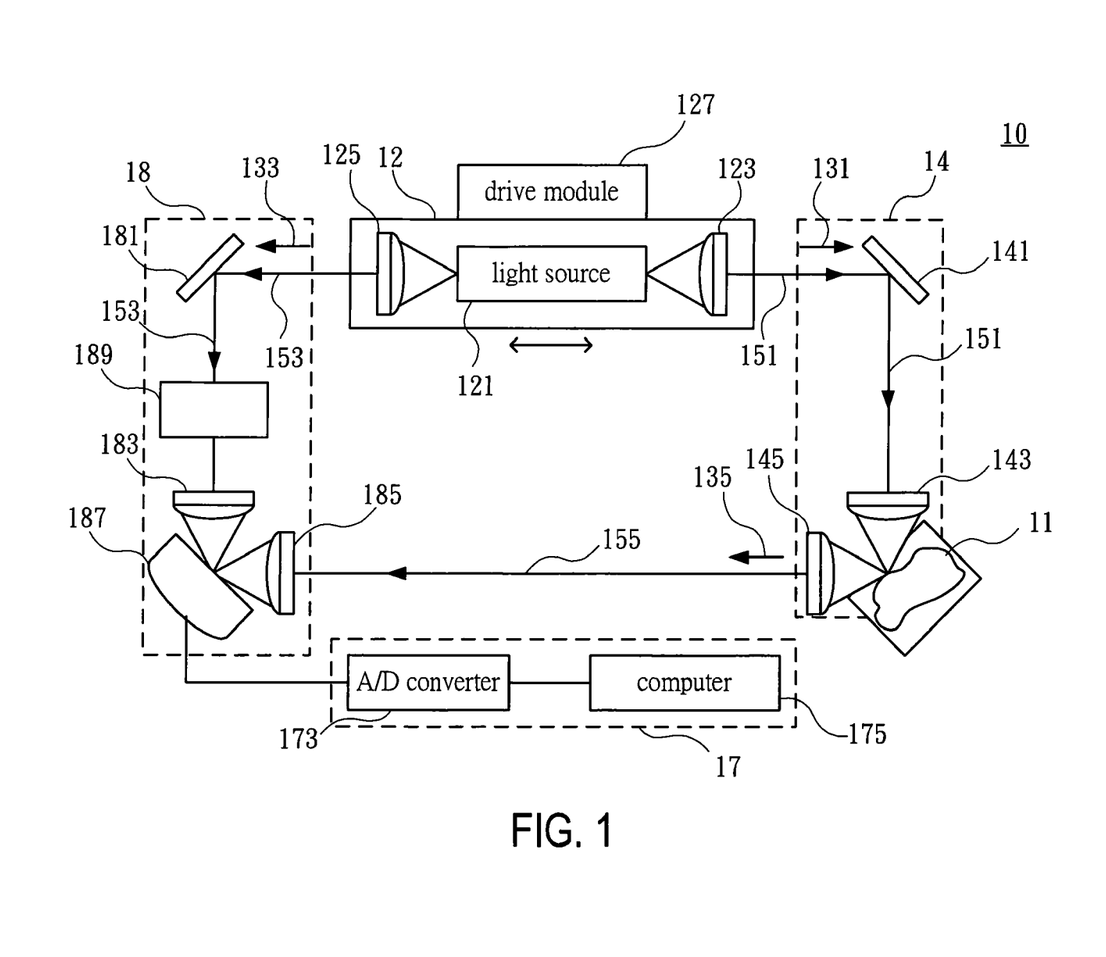
FIG. 1 is a schematic diagram of an optical imaging apparatus in accordance with one embodiment of the present invention.

Referring to FIG. 1, there is shown a schematic diagram of an optical imaging apparatus in accordance with one embodiment of the present invention. The optical imaging apparatus 10 comprises an optical source module 12, a sample probe module 14, an interference module 18, and a signal processing unit 17.

The optical source module 12 comprises an optical source 121 with a plurality of outputs. The optical source 121 is a short-coherence-length optical source or a partial-coherence-length optical source. Furthermore, the optical source can be a super luminescent diode (SLD) source with a plurality of outputs, or a Cr-doped fiber (CDF) source with a plurality of outputs, such as a two outputs super luminescent diode (SLD) source or a two outputs Cr-doped fiber (CDF) source. If the optical source 121 is selected to be a CDF source, there should be at least one optical pumping source provided (not shown in this embodiment).

The optical source module 12 provides a plurality of outputs at distinct sites, wherein at least one output of said plurality of outputs is used as a reference light 133, and at least one of said plurality of outputs is used as a sample light 131. The sample probe module 14 leads the sample light 131 from the optical source module 12 to a sample via a first light path 151. The sample light 131 is reflected or scattered by the sample 11. A portion of the reflected sample light is collected by the sample probe module 14 and forms an information light 135. The interference module 18 leads the reference light 133 from the optical source module 12 to the photo detector 187 via a second light path 153. The information light 135 is leaded by the interference module 18 from the sample probe module 14 to the photo detector 187 via a third light path 155.

In the optical imaging apparatus 10, the second light path 153 is configured to be approximately equal to the total length of the first light path 151 and the third light path 155 (which means the maximum difference between the second light path 153 and the sum of 151 and 155 can be in millimeter order), such that the reference light 133 and the information light 135 will be superimposed to form an interference light pattern on the photo detector 187. The photo detector 187 generates a signal that represents the interference light pattern and transmits the signal to the signal processing unit 17 for analyzing the spatial information of the sample 11. In another way, a light path compensation element 189 disposed on the second light path 153 can adjust the phase of the reference light 133 for interfering with the information light 135 on the photo detector 187.

In one embodiment of the present invention, the optical source module 12 further comprises a first collimating element 123 and a second collimating element 125. The first collimating element 123 is disposed in the output of the sample light 131 for collimating the sample light 131. The second collimating element 125 is disposed in the output of the reference light 133 for collimating the reference light 133.

The sample probe module 14 comprises a focusing element 143 for focusing the sample light 131 to the sample 11. There may be a mirror 141 or an optical fiber (not shown) in the sample probe module 14 for changing the direction of the sample light 131. The sample probe module 14 further comprises a third collimating element 145 for collimating the information light 135.

The interference module 18 comprises a focusing element 183 for focusing the reference light 133 to the photo detector 187. There may be a mirror 181 or an optical fiber (not shown) in the interference module 18 for changing the direction of the reference light beam 133. The interference module 18 further comprises a focusing element 185 for focusing the information light 135 to the photo detector 187.

In one embodiment of the present invention, the optical imaging apparatus 10 further comprises a drive module 127 connected to the optical source module 12. The drive module 127 drives the optical source module 12 to move to and fro to adjust the optical path difference of the first light path 151 and the second light path 153, wherein the third light path 155 is configured to be a constant. When the optical path difference is shorter than the coherence length of the light source 121, there is a peak in the intensity of the interference light pattern. By adjusting the optical path difference, the information that according to different depth of the sample 11 is obtained.

The signal processing unit 17 comprises an analog-to-digital (A/D) converter 173 and a computer 175. The A/D converter 173 converts the analog signal that represents the interference light pattern to a digital signal, and the computer 175 processes the digital signal to analyze the spatial information of the sample 11.

In the embodiment shown in the FIG. 1, no beam splitter is used to split light beam from the optical source 121. In other words, the optical imaging apparatus 10 of the present invention make use of the optical power supplied by the optical source 121 more efficiently.

Figure 2:
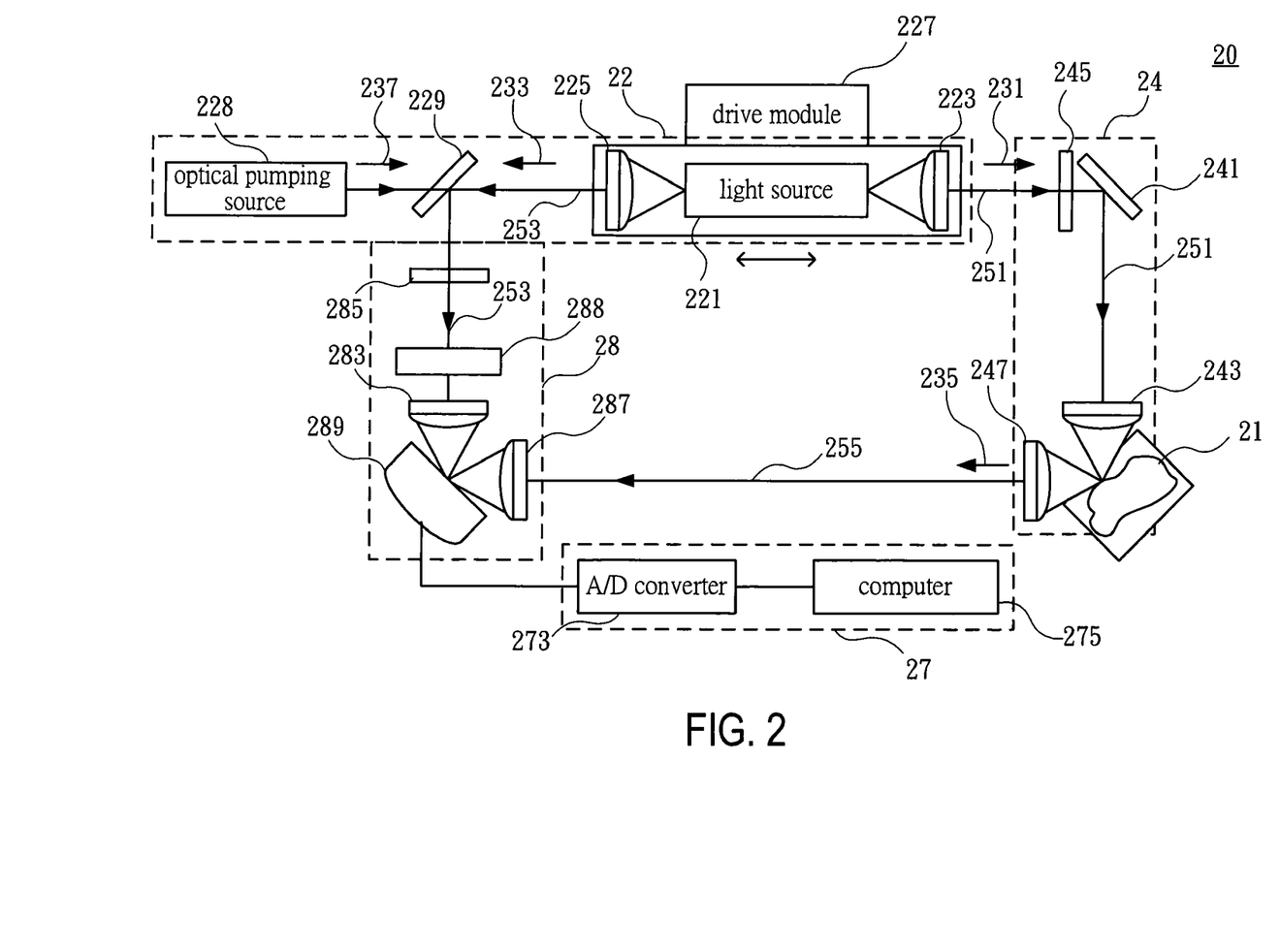
FIG. 2 is a schematic diagram of an optical imaging apparatus in accordance with another embodiment of the present invention.

Referring to FIG. 2, there is shown a schematic diagram of an optical imaging apparatus in accordance with another embodiment of the present invention. The optical imaging apparatus 20 comprises an optical source module 22 with an optical pumping source 228, a sample probe module 24, an interference module 28, and a signal processing unit 27.

The optical source 221 of the optical source module 22 is a two outputs CDF source, which is excited to luminance by a pumping light 237 from the optical pumping source 228. There is a dichroic mirror 229 disposed between the optical pumping source 228 and the optical source 221. The dichroic mirror 229 is transmissive for the pumping light 237 and reflective for the output of the optical source 221, such as the reference light 233. So that, the pumping light 237 transmits through the dichroic mirror 229 to the optical source 221, and the reference light 233 is reflected to the interference module 28.

The optical source 221 is excited and provides a sample light 231 and a reference light 233. The sample light 231 is leaded by the sample probe module 24 to the sample 11 via a first light path 251. The reference light 233 is reflected by the dichroic mirror 229 and leaded by the interference module 28 to the photo detector 289 via a second light path 253.

In order to prevent the photo detector 289 from being interfered by the pumping light 237, the sample probe module 24 comprises a first long pass filter 245 for blocking the pumping light 237, the interference module 28 comprises a second long pass filter 285 for blocking the pumping light 237. The sample probe module 24 can also comprises a mirror 241 or an optical fiber (not shown) to change the direction of the sample light 231. The interference module 28 can also comprises an optical fiber (not shown) to lead the reference light 233.

In one embodiment of the present invention, the optical source module 22 further comprises a first collimating element 223 for collimating the sample light 231, and a second collimating element 225 for collimating the reference light 233 and focusing the pumping light 237. The sample probe module 24 comprises a focusing element 243 for focusing the sample light 231 to the sample 21, and a third collimating element 247 for collimating the information light 235. The interference module 28 comprises a focusing element 283 for focusing the reference light 233 to the photo detector 289, and a focusing element 287 for focusing the information light 235 to the photo detector 289.

In the present embodiment, the length of the second light path 253 is configured to be approximately equal to the total length of the first light path 251 and the third light path 255 (which means the maximum difference between the second light path 253 and the sum of 251 and 255 can be in millimeter order). The reference light 233 and the information light 235 are superimposed to from an interference light pattern on the photo detector 289. Or by disposing a light path compensation element 288 on the second light path 253, the phase of the reference light 233 can be adjusted to interfere with the information light 235 on the photo detector 289.

The photo detector 289 generates a signal that represents the interference light pattern and transmits the signal to the signal processing unit 27. The A/D converter 273 of the signal processing unit 27 converts the analog signal that represents the interference light pattern to a digital signal, and the computer 275 of the signal processing unit 27 processes the digital signal to analyze the spatial information of the sample 21.

The optical imaging apparatus 20 further comprises a drive module 227 connected to the optical source 221 and the collimating elements 223 and 225. Using the drive module 227 to move the optical source 221 and the collimating elements 223 and 225 to adjust the optical path difference of the first light path 251 and the second light path 253, the information that according to different depth of the sample 21 is obtained.

Figure 3:
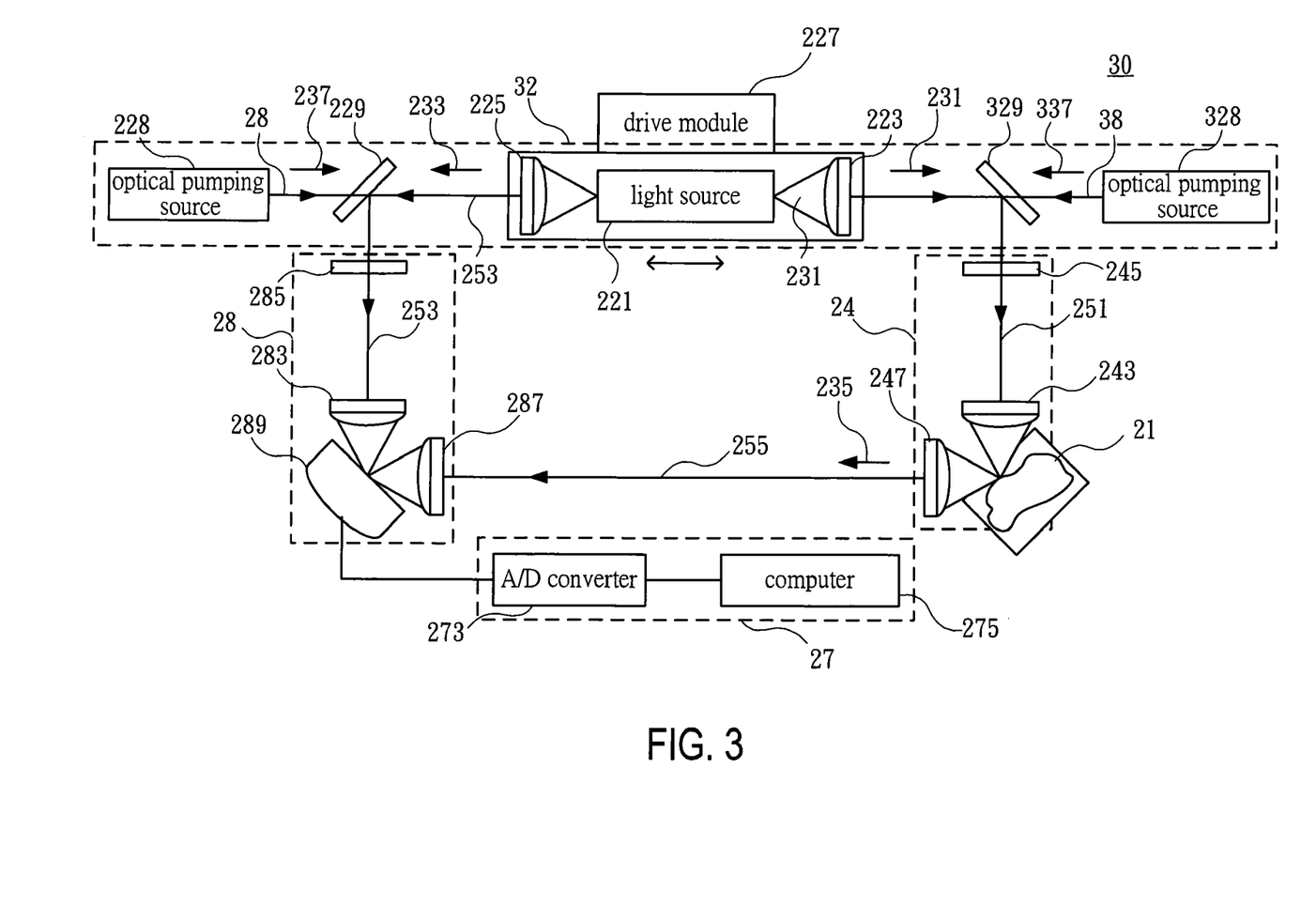
FIG. 3 is a schematic diagram of an optical imaging apparatus in accordance with another embodiment of the present invention.

Referring to FIG. 3, there is shown a schematic diagram of an optical imaging apparatus in accordance with another embodiment of the present invention. The optical imaging apparatus 30 of the present embodiment is almost the same as the embodiment shown in FIG. 2. The optical source module 32 of the present embodiment comprises a CDF source 221 with two optical pumping sources 228 and 328. The optical pumping source 228 provides a pumping light 237. The optical pumping source 328 provides another pumping light 337. Both of the pumping lights 237 and 337 are transmitted to the optical source 221 for exciting the CDF source 221 to luminance. With two pumping source 228 and 328, the optical source 221 is expected to provide the sample light 231 and the reference light 233 with much higher intensity than the afore mentioned embodiments.

The optical source module 32 further comprises two dichroic mirrors 229 and 329. The dichroic mirror 229 is disposed between the optical pumping source 228 and the optical source 221, and the dichroic mirror 329 is disposed between the optical pumping sources 328 and the optical source 221. The dichroic mirrors 229 and 329 are configured to be transmissive for the pumping lights 237 and 337, and reflective for the sample light 231 and the reference light 233. So that, the pumping lights 237 and 337 transmit through the dichroic mirror 229 and 329 respectively to the optical source 221, and the reference light 233 and the sample light 231 are reflected to the interference module 28 and the sample probe module 24 respectively.

Figure 4:
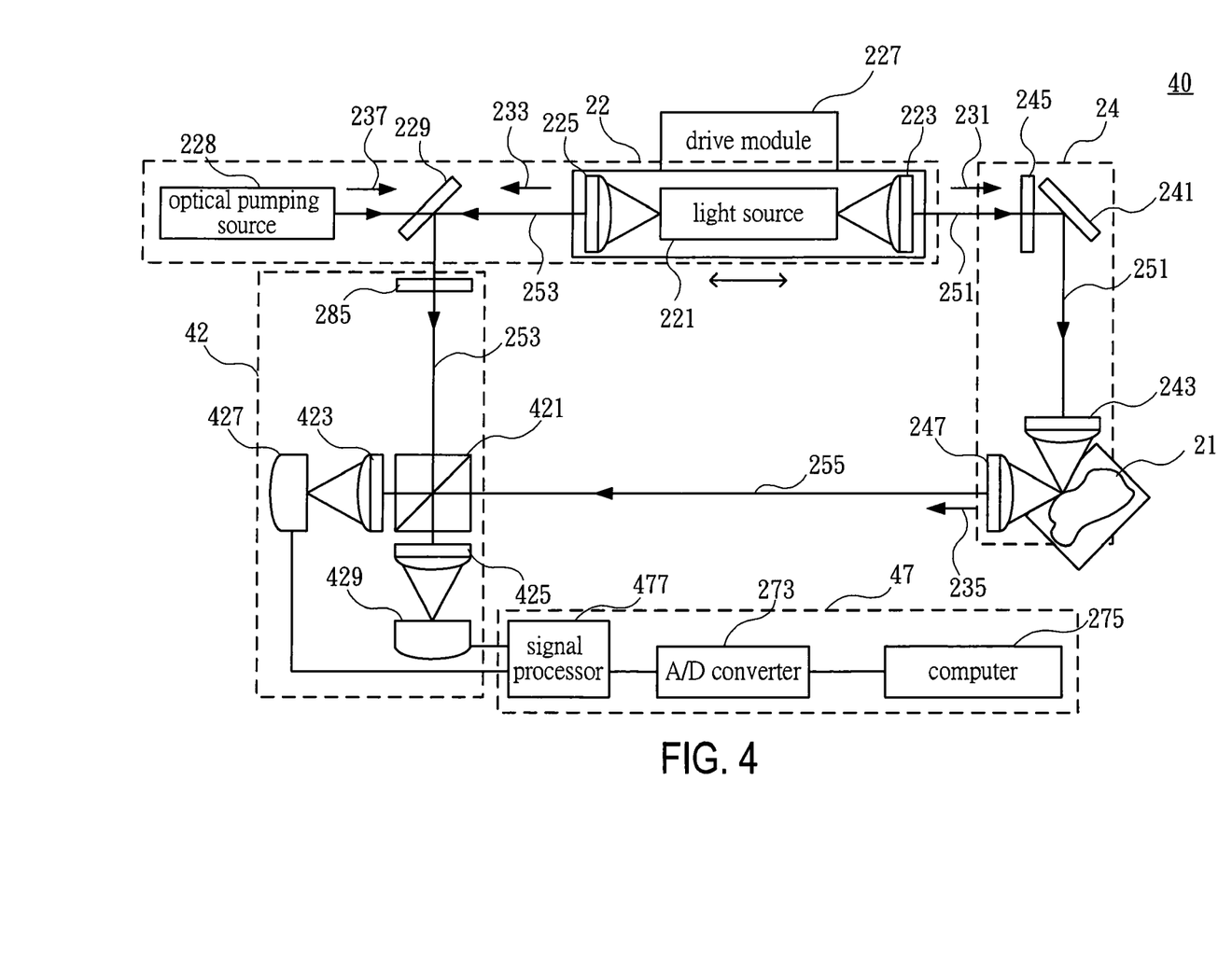
FIG. 4 is a schematic diagram of an optical imaging apparatus in accordance with another embodiment of the present invention.

Referring to FIG. 4, there is shown a schematic diagram of an optical imaging apparatus in accordance with another embodiment of the present invention. The optical imaging apparatus 40 of the present embodiment is almost the same as the embodiment shown in FIG. 2, but the interference module 42 is different.

The interference module 42 comprises a long pass filter 285, a beam splitter 421, a first photo detector 427, and a second photo detector 429. The long pass filter 285 is used for blocking the pumping light 237. The beam splitter 421 is configured to split the reference light 233 to the first photo detector 427 and the second photo detector 429, and split the information light 235 to the first photo detector 427 and the second photo detector 429. Such that, the split reference lights and the split information lights are superimposed to form interference light patterns on the first photo detector 427 and the second photo detector 429 respectively.

The first photo detector 427 and the second photo detector 429 generate signals that represent the interference light patterns respectively, and transmit the signals to the signal processing unit 47.

The signal processing unit 47 comprises a signal processor 477, an A/D converter 273, and a computer 275. The signal processor 477 receives the signals that represent the interference light patterns and superimposes the signals to a superimposed signal. The A/D converter 273 converts the superimposed signal to a digital signal, and transmits the digital signal to the computer 275 for analyzing the spatial information of the sample 21.

The interference module 42 further comprises a first focusing element 423 and a second focusing element 425. The first focusing element 423 and the second focusing element 425 are configured to focus the split reference lights and the split information lights to the first photo detector 427 and the second photo detector 429.

In the present embodiment, the beam splitter 421 of the interference module 42 splits the interference light pattern to the first photo detector 423 and the second photo detector 425, and then the signal processor 477 superimpose the signals from the first photo detector 423 and the second photo detector 425. This broadens the intensity tolerance scope of the interference module 42.

Figure 5:
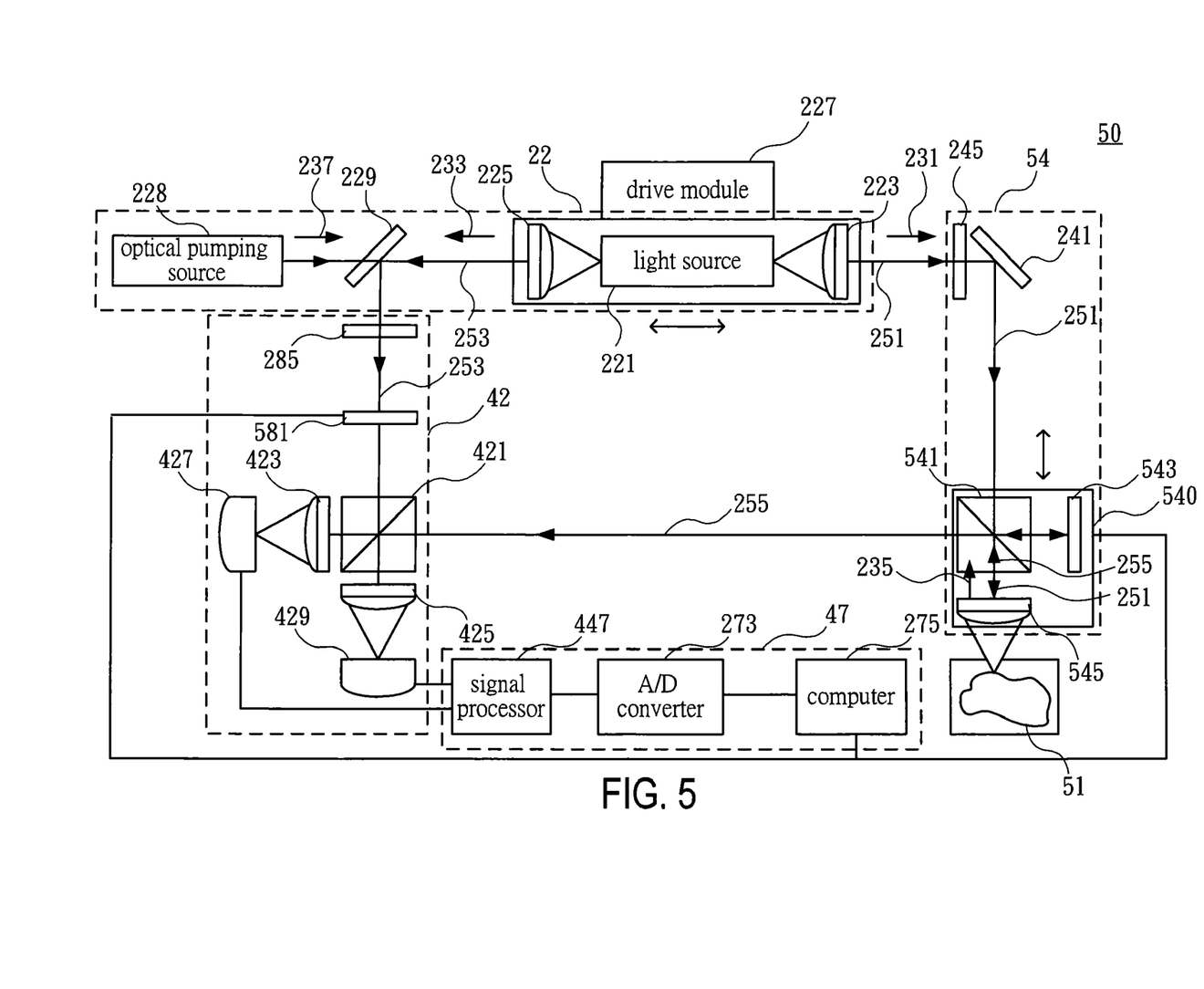
FIG. 5 is a schematic diagram of an optical imaging apparatus in accordance with another embodiment of the present invention.

Referring to FIG. 5, there is shown a schematic diagram of an optical imaging apparatus in accordance with another embodiment of the present invention. The optical imaging apparatus 50 of the present embodiment is almost the same as the embodiment shown in FIG. 4, but the sample probe module 54 further comprises a sensing module 540.

The sensing module 540 comprises a beam splitter 541, a mirror 543, and a focusing element 545. The beam splitter 541 is configured to split the sample light to the mirror 543 and the sample 51. The focusing element 545 is configured to focus one of the split sample light to the sample 51. A portion of the reflected sample light 231 is collimated by the focusing element 545 to form an information light 235. And then a portion the information light 235 is reflected to the interference module 42 by the beam splitter 541. Another of the split sample light is reflected by the mirror 543, and transmits partly through the beam splitter 541 to the interference module 42. The information light 235 and the reflected sample light from the mirror 543 are superimposed to form an interference light pattern on the photo detectors 427 and 429 of the interference module 42.

In the present embodiment, the mirror 543 is disposed at a distance from the beam splitter 541 that is equal to the distance between the beam splitter 541 and the focus of the focusing element 545. When we want to focus the sample light 231 to the sample 51, we firstly block or remove the reference light 233. Then move the sensing module 540 closer to or farther from the sample 51, and we will get a peak in the intensity of the interference light pattern when the focus of the lens is located at the sample 51. Wherein, the reference light 233 may be blocked by a blocker 581 in the interference module 42, or be removed by removing the dichroic mirror 229 of the optical source module 22.

After focusing, remove the mirror 543 of the sensing module 540 and the blocker 581 of the interference module 42. And then using the drive module 227 to drive the optical source 221 and the collimating elements 223 and 225 moving to and fro, the information that according to the difference depth of the sample 51 is obtained. Wherein, the mirror 543 of the sensing module 540, the blocker 581 in the interference module 42, the drive module 227, and the sensing module 540 are controlled by the computer 275 of the signal processing unit 47. The photo detectors 427 and 429, and the beam splitter 421 of the interference module 42 and the signal processing unit 47 may be replaced by the photo detector (171) and the signal processing unit (17) shown in FIG. 2, when the optical source 221 cannot provide enough optical power.

Figure 6:
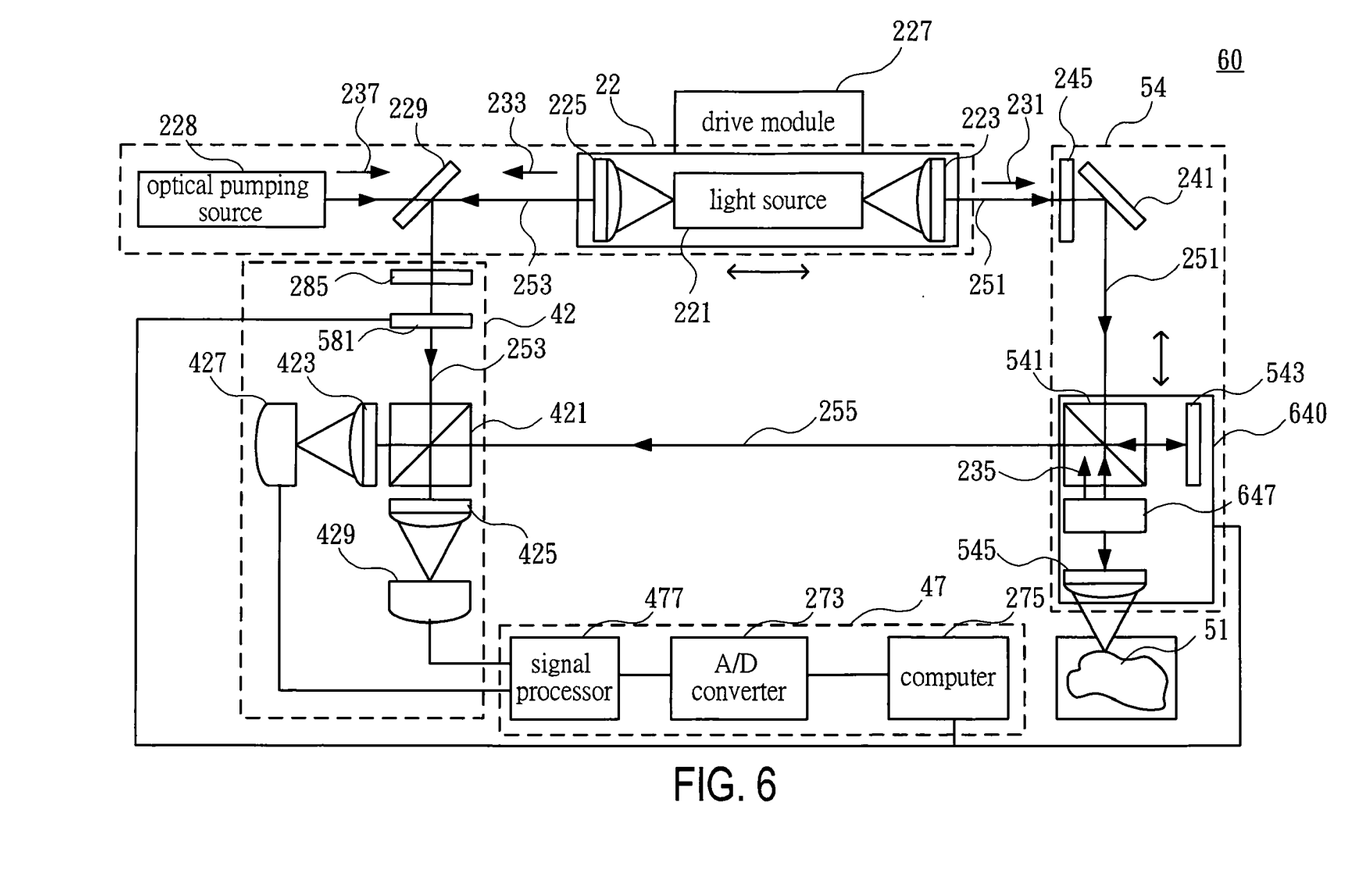
FIG. 6 is a schematic diagram of an optical imaging apparatus in accordance with still another embodiment of the present invention.

Referring to FIG. 6, there is shown a schematic diagram of an optical imaging apparatus in accordance with another embodiment of the present invention. The optical imaging apparatus 60 of the present embodiment is almost the same as the embodiment shown in FIG. 5, but the sensing module 640 further comprises a scanning module 647.

The scanning module 647 is disposed between the beam splitter 541 and the sample 51 for moving the sample light 231 transversely on the sample 51. To cooperate with the moving of the optical source 221 and the collimating elements 223 and 225, the optical imaging apparatus 60 of the present embodiment can obtain a three-dimensional information according to the sample 51.

To embody the scanning module 647, there may be two rotatory mirrors that are always parallel to each other (not shown). By changing the direction of the mirrors, the position that the sample light 231 falls on the sample 51 changes accordingly.

The present invention is not limited to the above-described embodiments. Various alternatives, modifications and equivalents may be used. Therefore, the above embodiments should not be taken as limiting the scope of the invention, which is defined by the appending claims.

What is claimed is:

1. An optical imaging apparatus, comprising:
    an optical source module including Cr-doped fiber (CDF) and at least one optical pumping source and without a beam splitter, wherein said optical source comprises two outputs at the two ends of the CDF, said two outputs interfere with each other, wherein one of said outputs is used as a reference light, and another one of said outputs is used as a sample light;
    a sample probe module for leading said sample light from said optical source module to a sample via a first light path, wherein a portion of said sample light is reflected or scattered by said sample to form an information light, wherein said information light is leaded out by said sample probe module;
    an interference module including at least one photo detector, wherein said interference module leads said reference light from said optical source module to said at least one photo detector via a second light path, and leads said information light from said sample probe module to said at least one photo detector via a third light path; and
    a signal processing unit electrically coupled to said photo detector of said interference module for analyzing a spatial information of said sample.

2. The optical imaging apparatus of claim 1, wherein said reference light and said information light are superimposed to form an interference light pattern on each of said at least one photo detector, each of said at least one photo detector generates a signal that represents said interference light pattern and transmits said signal to said signal processing unit for analyzing the spatial information of said sample.

3. The optical imaging apparatus of claim 1, wherein said optical source is a short-coherence-length optical source or a partial-coherence-length optical source.

4. The optical imaging apparatus of claim 1, wherein the length of said second light path is approximately equal to the total length of said first light path and said third light path.

5. The optical imaging apparatus of claim 1, further comprising a light path compensation element disposed on said second light path for adjusting the phase of said reference light.

6. The optical imaging apparatus of claim 1, further comprising a drive module connected to said optical source module for moving said optical source module to adjust the optical path difference of said first light path and said second light path.

7. The optical imaging apparatus of claim 1, wherein said optical source module comprises:
    a first collimating element for collimating said sample light; and
    a second collimating element for collimating said reference light.

8. The optical imaging apparatus of claim 1, wherein said sample probe module comprises:
    a focusing element for focusing said sample light to said sample; and
    a third collimating element for collimating said information light.

9. The optical imaging apparatus of claim 1, wherein said interference module comprises:
    a first focusing element for focusing said reference light to said at least one photo detector; and
    a second focusing element for focusing said information light to said at least one photo detector.

10. The optical imaging apparatus of claim 1, wherein said optical source module comprises at least one dichroic mirror disposed respectively between said at least one optical pumping source and said CDF source, wherein each of said at least one dichroic mirror is transmissive for the output of said at least one optical pumping source and reflective for the outputs of said CDF source.

11. The optical imaging apparatus of claim 10, wherein said sample probe module comprises a first long pass filter for blocking said output of said optical pumping source, and said interference module comprises a second long pass filter for blocking said output of said optical pumping source.

12. The optical imaging apparatus of claim 1, wherein said signal processing unit comprises an analog-to-digital (A/D) converter and a computer.

13. The optical imaging apparatus of claim 1, wherein said interference module comprises:
    a first photo detector;
    a second photo detector; and
    a beam splitter for splitting said reference light to said first photo detector and said second photo detector, and splitting said information light to said first photo detector and said second photo detector;
    wherein said split reference lights and said split information lights are superimposed on said first photo detector and second photo detector respectively, and signals that represent said interference light pattern are transmitted to said signal processing unit.

14. The optical imaging apparatus of claim 13, wherein said signal processing unit comprises:
    a signal processor electrically coupled to said first photo detector and said second photo detector for receiving said signals that represent said interference light pattern, and superimposing said signals that represent said interference light pattern into a superimposed signal;

an A/D converter electrically coupled to said signal processor for converting said superimposed signal to a digital signal; and a computer for processing said digital signal to analyze the spatial information of said sample.

15. The optical imaging apparatus of claim 1, wherein said sample probe module comprises a sensing module including a focusing element for focusing said sample light to said sample and collimating said information light beam.

16. The optical imaging apparatus of claim 15, wherein said sensing module comprises a beam splitter for reflecting said information light to said interference module.

17. The optical imaging apparatus of claim 16, wherein said sensing module further comprises a mirror for automatic focusing.

18. The optical imaging apparatus of claim 15, wherein said sensing module further comprises a scanning unit.

19. An optical imaging method, comprising steps of:
providing an optical source with a two outputs Cr-doped fiber (CDF) and without a beam splitter;
using one of said outputs of said optical source as a reference light, and another one of said outputs as a sample light;
leading said sample light to said sample via a first light path, wherein a portion of said sample light is reflected or scattered by said sample to form an information light;
leading said reference light to a photo detector via a second light path;
leading said information light to said photo detector via a third light path;
providing a signal processing unit electrically coupled to said photo detector;
adjusting the length of said second light path and the total length of said first light path and said third light path;
analyzing a spatial information of said sample by said signal processing unit.

20. The method of claim 19, wherein said optical source is a short-coherence-length optical source or a partial-coherence-length optical source.

21. The method of claim 19, wherein said adjusting step comprises moving said optical source to and fro by a drive module connected to said optical source.

22. The method of claim 19, further comprising the step of scanning said sample light on said sample.

* * * * *